INVENTOR.
David E. Griswold
BY
Bacon & Thomas
ATTORNEYS

Nov. 16, 1965   D. E. GRISWOLD   3,217,883
FLUID BLENDING SYSTEMS AND CONTROL MEANS THEREFOR
Filed June 27, 1960
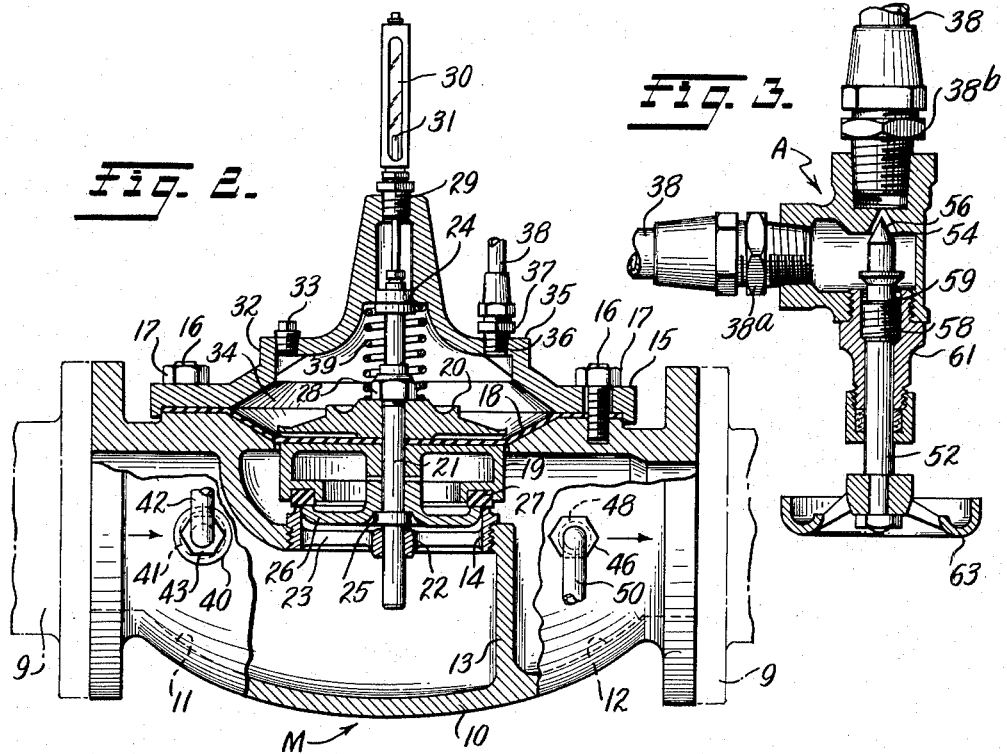
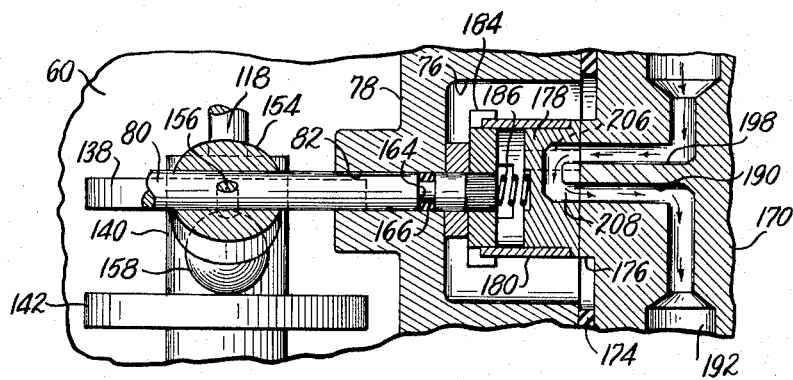
INVENTOR.
David E. Griswold
BY
Bacon & Thomas
ATTORNEYS

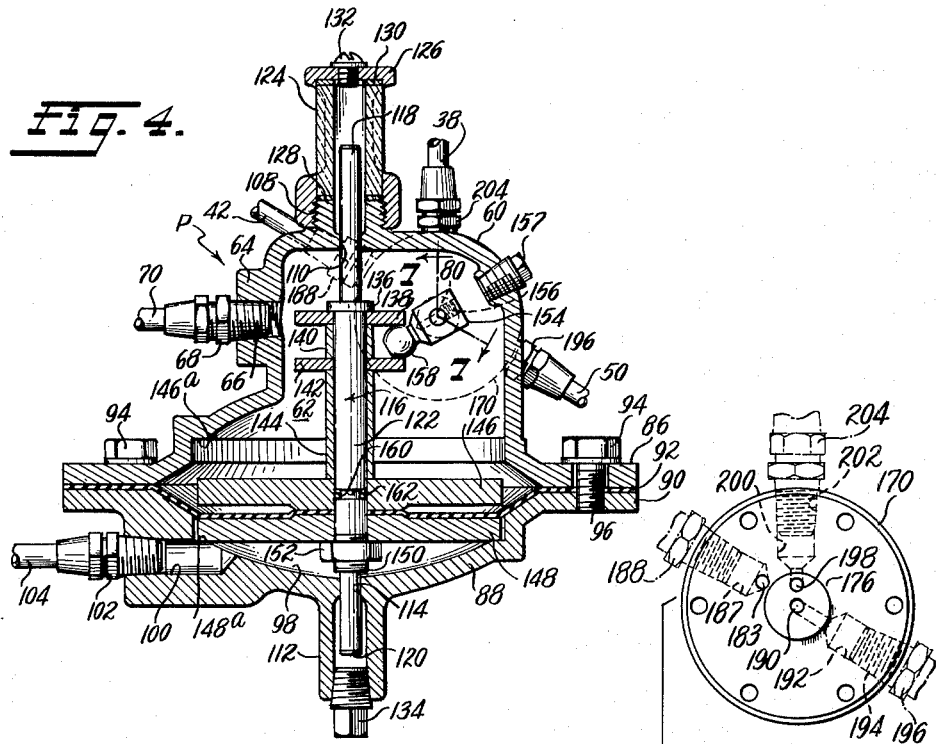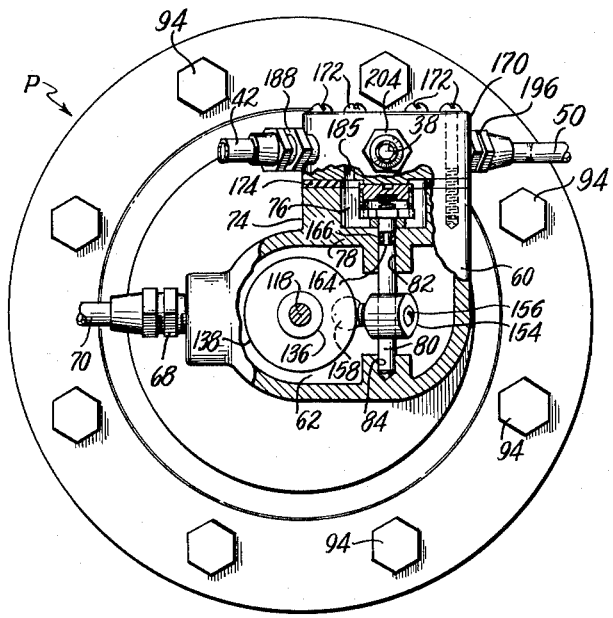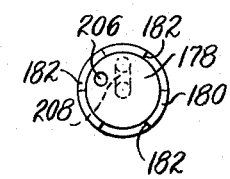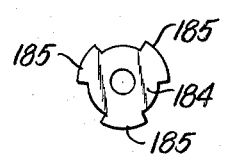

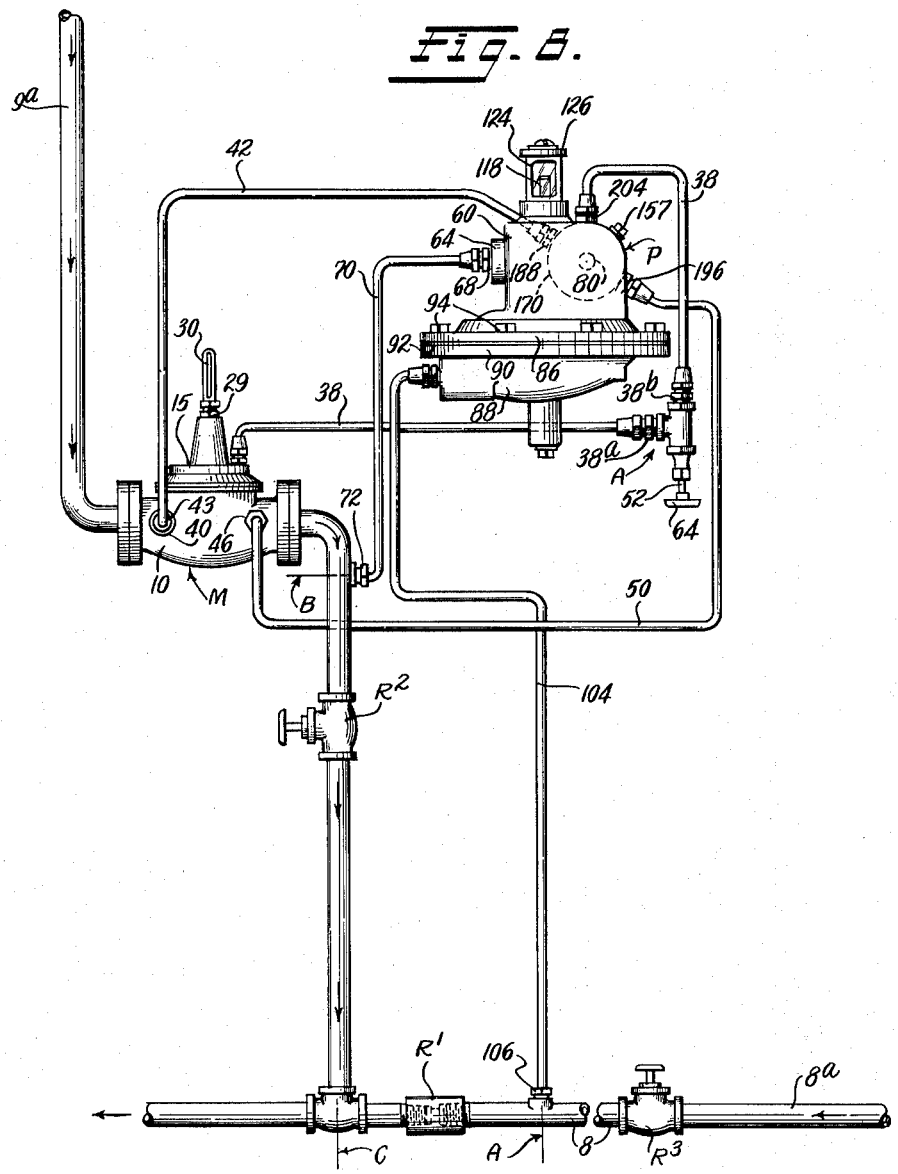

United States Patent Office 3,217,883
Patented Nov. 16, 1965

3,217,883
FLUID BLENDING SYSTEMS AND CONTROL
MEANS THEREFOR
David E. Griswold, Newport Beach, Calif., assignor to
Donald G. Griswold, Newport Beach, Calif.
Filed June 27, 1960, Ser. No. 38,878
8 Claims. (Cl. 210—101)

The present invention is particularly well adapted for use in blending softened water with a given percentage of raw water. However, the system is also useful for blending two liquids or gases derived from separate sources, for example, water from a well with water from a pipeline, or natural gas with manufactured gas.

By way of reference to an operative example of the invention, the present system will be described principally in connection with a water softener system, although it obviously is not limited to such use.

As is well known, objectionable properties of water due to hardness, can be removed by passing the same through a conventional hydrogen or sodium zeolite softener. For many purposes, such as municipal, commercial, and institutional water supply, 100 percent softened (zero hardness) water is not required. For such general purposes, an effluent with a hardness of 3 to 5 grains per gallon (50 to 85 parts per million) is satisfactory. An effluent of this character can be obtained by mixing the zero hardness effluent from the water softener with sufficient raw or hard water to produce the desired ratio. For example, if the raw water supply has a hardness of 15 grains per gallon, and is to be softened to 5 grains per gallon, only two-thirds of the water consumed need be passed through the water softener. The system and control means described hereinafter will effect mixing of the two types of water in proper proportion by installing a main or blending valve in a by-pass line in parallel with the softener apparatus.

Some of the advantages of this arrangement are:

First, that the battery of water softeners required for large systems could consist of only two-thirds as many units as would be required if blending were not provided for;

Second, the cost of regenerating the water softener units would be reduced by one-third; and Third, neutralization of the effluent by blending raw water therewith will reduce corrosion in certain systems.

However, as will appear hereinafter, the principles of the present blending system are applicable to blending any two fluids under pressure.

The principal object of the invention is to provide a valve-controlled system that will accurately blend two different liquids or gases in a desired ratio and maintain such ratio regardless of pressure changes in the additive fluid and regardless of changes in demand on the primary fluid, from maximum capacity flow to zero flow.

A further object is to provide a self-contained, automatic fluid blending system that is operable in response to line pressure and which requires no external source of power for operating the system.

Another object is to provide a fluid blending system wherein the proportions of the additive and primary fluids comprising the blend can be varied as desired, and wherein a main or blending valve can be actuated and/or adjusted to vary its response rate in accordance with variations in pressure in the system.

Still another object is to provide a blending system, including a main valve and control means therefore comprising pilot valve and differential pressure responsive means operated by pressures derived from two remote sensing points in the system, and wherein the latter means is operable in response to such differential pressure for actuating a rotary pilot valve to control the operation of the main or blending valve.

A further object is to provide a blending system that is designed to be added to existing installations, such as liquid treating apparatus, without disturbing the valves associated with such apparatus.

A more specific object is to provide a blending system designed to be associated with a water softener for adding a predetermined proportion of raw water to the effluent from the softener, regardless of the influent raw water pressure and variations in demand on the effluent.

A further object is to provide a blending control valve including means for visibly indicating the extent of opening of the valve.

A still further object is to provide a differential-pressure-operated, rotary pilot valve with means for indicating the position of the rotary element thereof.

Other and further objects of the invention will be apparent from the following description taken in conjunction with the accompanying drawings, wherein:

FIG. 2 is a vertical sectional view through the main or blending valve of the system;

FIG. 3 is a vertical sectional view through a needle valve for adjusting the rate of opening and closing of the main valve;

FIG. 4 is a vertical sectional view through the pressure-differential-operated pilot valve;

FIG. 5 is a plan view of the pilot valve shown in FIG. 4, with portions of the pilot valve housing broken away to illustrate the pilot disc and its operating shaft;

FIG. 6 is an exploded view illustrating several of the component parts of the pilot valve;

FIG. 7 is an enlarged fragmentary sectional view through the pilot valve taken on the line 6—6 of FIG. 4; and FIG. 8 is a diagrammatic view illustrating the manner in which the present blending system can be used to blend any two fluids in predetermined ratio.

Figure 1:
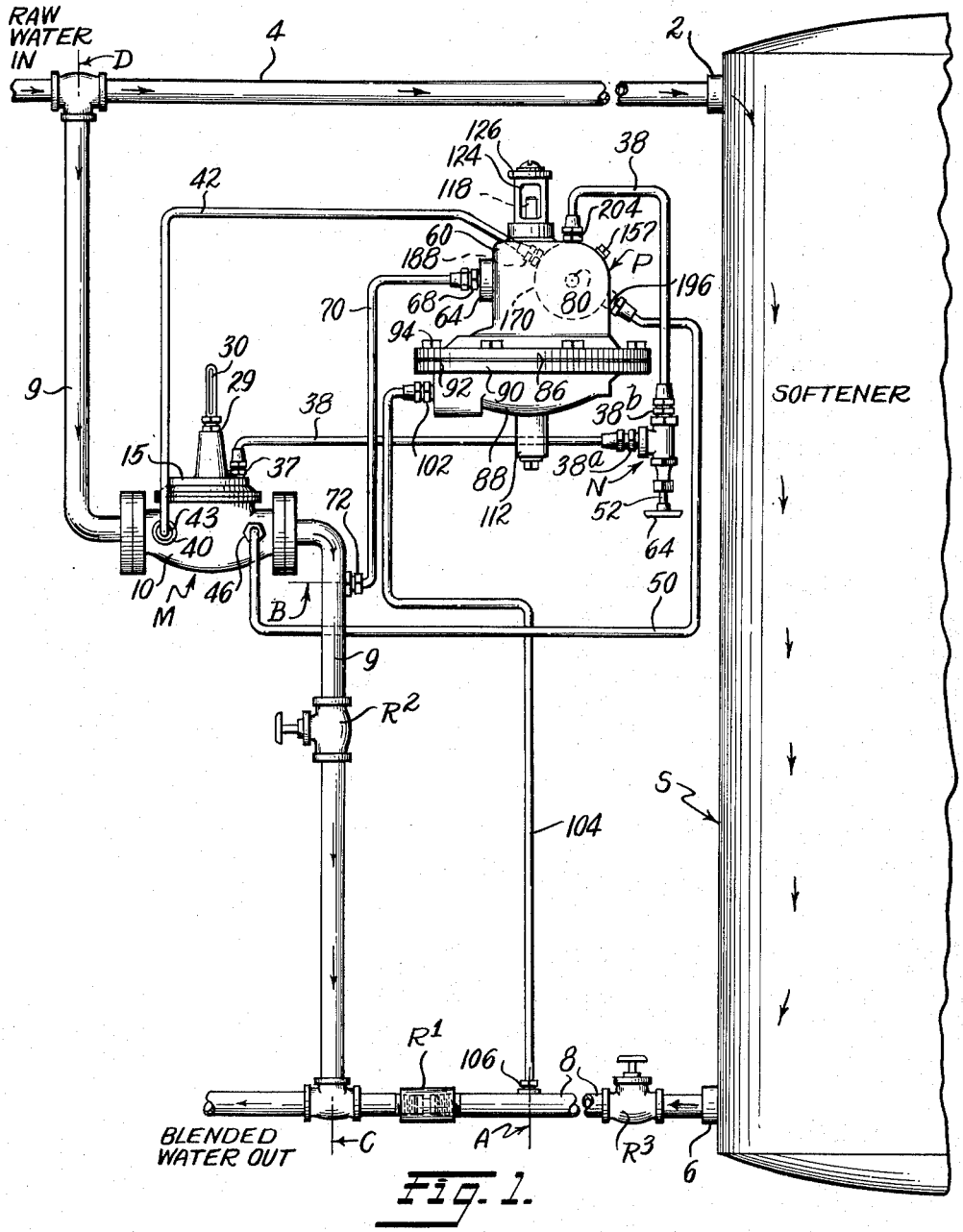
FIG. 1 is a diagrammatic view illustrating the present blending system connected with a water softener unit.

Referring to FIG. 1, the blending system comprises a blending or main valve M, a pressure-differential-operated pilot control unit P, an adjustable needle valve N, an element R-1 containing a fixed orifice, an adjustable restrictor valve R-2 providing a variable orifice, and an adjustable restrictor valve R-3 providing a second variable orifice, the foregoing elements being interconnected by piping and tubing described in detail hereinafter, and associated with a conventional water softener unit S.

Raw water is supplied to an inlet 2 at the upper end of the tank of the water softener S through a supply or influent pipe 4. Softened water is discharged from an outlet 6 at the lower end of said tank into a discharge or effluent pipe 8. The supply pipe 4 and discharge pipe 8 have T-fittings connected therein and are interconnected by a pipe 9 at points D and C, respectively, the pipe 9 being connected with said fittings and being arranged in parallel, or by-passing relation, with the softener S. The fixed orifice element R-1 and the adjustable restrictor valve R-3 are connected in the discharge pipe 8, with the valve R-3 located upstream of the element R-1. The main or blending valve M is connected in the by-pass pipe 9. The adjustable restrictor valve R-2 is also connected in the by-pass pipe 9, but at a location between the valve M and the point of connection C of the by-pass pipe with the discharge pipe 8.

Refrring to FIG. 2, the main valve M comprises a body 10 provided with an inlet chamber 11 and an outlet chamber 12. A partition 13 separates the chambers 11 and 12 and serves as a support for a valve seat 14. A cover 15 is secured to the valve body 10 by a plurality of studs 16 and nuts 17, a flexible conventional diaphragm 18 being interposed between said valve body and cover.

A diaphragm supporting plate 19 is disposed in the body 10 below the diaphragm 18 and another supporting plate 20 is disposed in the cover 15 above said diaphragm. A valve stem 21 extends through the diaphragm 18 and its supporting plates 19 and 20 and is slidably mounted at its lower end in a guide 22 supported by arms 23 connected with the seat 14. The upper end of the valve stem 21 is guided in a bushing 24 mounted in the cover 15. The stem 21 has a shoulder 25 disposed above the guide 22, which serves as an abutment for a disc 26. The supporting plate 19 has an annular groove formed in the lower face thereof in which a sealing ring 27 is disposed and held in place by the outer marginal portion of the disc 26. The stem 21 is threaded in the region of the plate 20 and a self-locking nut 28 is threaded thereon to secure the diaphragm 18, supporting plates 19 and 20, disc 26, and sealing ring 27 in assembled relation. The sealing ring 27 cooperates with the seat 14 to control the flow of fluid through the main valve M.

The cover 15 has a central threaded opening above the stem 21 in which is mounted a fitting 29 carrying a sight glass 30. A rod 31 is attached to the upper end of the stem 21 and is visible through the sight glass 30 to indicate the position of the valve closure assembly 19–26–17 relative to the seat 14. A threaded opening in a lateral boss 32 on the cover 15 is closed by a plug 33. The cover 15 cooperates with the diaphragm 18 to provide a pressure chamber 34 for operating fluid under pressure. A lateral boss 35, similar to the boss 32, has a threaded opening 36 in which a conventional fitting 37 is mounted. One end of a tube or conduit 38 is connected to the fitting 37 for the purpose of conducting the operating fluid to and from the diaphragm pressure chamber 34, as will be explained more fully hereinafter. A compression spring 39 is disposed in the chamber 34 between cover 15 and the plate 20 and constantly tends to urge the valve stem 21 downwardly toward its valve closing position against line pressure in the by-pass pipe 9.

A conventional strainer 40 is mounted in a threaded opening 41 in communication with the inlet chamber 11 of the main valve M. One end of a tube or conduit 42 is connected by a fitting 43 with the strainer 40. The other end of the conduit 42 is connected with the pilot valve unit P for conducting operating fluid under pressure thereto in a manner to be described later. The purpose of the strainer 40 is to prevent foreign matter from entering the pilot valve.

A conventional fitting 46 is mounted in a threaded opening 48 communicating with the outlet chamber 12 of the valve M. One end of a tube 50 is connected with the fitting 46 and the opposite end of said tube is connected with the pilot valve unit P in a manner and for a purpose which will be described later.

The conduit 38 interconnects the pressure chamber 34 of the main valve M and the pilot valve unit P and has the needle valve N connected therein. As is shown in FIG. 1, portions of the conduit 38 are connected to the valve N by conventional fittings 38a and 38b. The needle valve N is of conventional construction and the details thereof are illustrated in FIG. 3. This valve includes a stem 52 having a conical point 54, which cooperates with a conical seat 56 to control the rate of flow of operating fluid through the conduit 38 to and from the pressure chamber 34 of the main valve M to thus control the rate of response of said main valve to varying demands on the effluent in pipe 8. The stem 52 has a threaded portion 58 mounted in a threaded bore 59 in a body portion 61 of the valve N, whereby the stem 52 can be manually rotated through a handwheel 63 to adjust the conical end 54 of the stem 52 relative to the seat 56.

The pilot valve unit P comprises a rotary pilot valve and a differential pressure responsive control for actuating the pilot valve, and is illustrated in detail in FIGS. 4 to 7. The unit P includes a housing section 60, which contains a pressure chamber 62. A boss 64 on the housing section 60 contains a threaded opening 66 in which a conventional fitting 68 is mounted. The fitting 68 is connected to one end of a tube or conduit 70, the opposite end of which is connected by a fitting 72, FIG. 1, with the by-pass pipe 9. The fitting 72 is located at a remote sensing point B disposed between the outlet side of the main valve M, and the manually adjustable restrictor valve R–2, whereby the pressure at the sensing point B is communicated through the conduit 70 to the pressure chamber 62.

Referring to FIG. 5, the housing section 60 has a cylindrical extension 74 projecting laterally therefrom, which provides a pressure chamber 76 for operating fluid under pressure. The chambers 62 and 76 are separated by an internal wall 78. A pilot shaft 80 extends through an opening 82 in the wall 78 and one end thereof is supported in a recess 84 formed in a boss on the wall portion of the housing section 60.

The housing section 60 has an integral flange 86 projecting horizontally therefrom at its lower end. A dished cover 88 has a similar horizontal flange 90 at its upper edge. A flexible diaphragm 92 is disposed between the flanges 86 and 90, said flanges and diaphragm being secured together in leak-proof relation by a plurality of cap screws 94 extending through openings in the flange 86 and diaphragm 92 and into threaded openings 96 in the flange 90. The diaphragm 92 cooperates with the cover 88 to provide a pressure chamber 98 below said diaphragm; whereas, said diaphragm cooperates with the housing 60 to form the pressure chamber 62, which is disposed above said diaphragm.

The cover 88 has an opening 100 that communicates at its inner end with the pressure chamber 98, and is threaded at its outer end to receive a conventional fitting 102. The fitting 102 is connected to one end of a tube or conduit 104, the other end of which is connected by a fitting 106, FIG. 1, with the effluent pipe 8 at a remote sensing point A located between the fixed orifice member R–1 and the manually adjustable flow restrictor valve R–3. Thus, the pressure in the pipe 8 at the sensing point A is communicated through the conduit 104 to the pressure chamber 98 at the lower side of the diaphragm 92.

The housing section 60 has an externally threaded boss 108, FIG. 4, provided with a bore 110. The cover 88 has a boss 112 provided with a bore 114 aligned with the bore 110. A stem 116 has a reduced upper end 118 slidably mounted in the bore 110 and a reduced lower end 120 slidably mounted in the bore 114, an enlarged intermediate portion 122 being disposed between the reduced ends 118 and 120. The upper end portion 118 of the stem is enclosed by a transparent cylindrical tube 124 formed from "Lucite" (or any other suitable material, which is transparent). The tube 124 serves as a sight to provide a visual indication of the position of the stem 118 to thus indicate the position of a rotary pilot valve disc, as will be described later.

The sight tube 124 is secured to the threaded boss 108 by an indicator housing 126, which telescopes the same and is threaded onto the boss 108. A gasket 128 is disposed between the lower end of the tube 124 and the adjacent face of the boss 108 and a similar gasket 130 is disposed between the upper end of the tube and the indicator housing 126. A vent screw 132 is mounted in an opening in the housing 126 for venting air from the chamber within the tube 124. The bore 114 in the boss 112 of the cover 88 is threaded at its outer end and is closed by a conventional pipe plug 134.

The enlarged stem portion 122 has a shoulder 136 adjacent the reduced end portion 118, said shoulder forming a stop for a disc 138. A cylindrical spacer 140 is mounted on the stem portion 122 and one end thereof engages the disc 138. A second disc 142 is mounted on the stem portion 122 in engagement with the opposite end of the spacer 140. A second, relatively longer spacer 144 is mounted upon the stem portion 122 with its upper end engaged with the disc 142 and its lower end in engagement with a diaphragm supporting washer 146 disposed above the diaphragm 92 and located within the chamber 62. The stem 116 extends through the washer 146, diaphragm 92, and through a second diaphragm supporting washer 148 located below said diaphragm in the pressure chamber 98. The lower end of the enlarged portion 122 is threaded, as indicated at 150, and a nut 152 is mounted thereon to secure the aforementioned parts in assembled relation with the stem 116.

The pilot shaft 80, previously referred to, is normally disposed horizontally and has an operating arm 154 secured thereto along the portion thereof located in the chamber 62, a pin 156 threadedly mounted in said arm, having a reduced portion extending through the shaft 80. The pin 156 is accessible through an opening in the housing 60 which is normally closed by a plug 157. The arm 154 has a rounded or substantially spherical free end 158, which projects into the space between the discs 138 and 142. The diameter of the spherical portion 158 is substantially equal to the length of the spacer 140 disposed between the discs 138 and 142, so that rotary movement is imparted to the shaft 80 upon reciprocation of the stem 116. The spherical portion 158 has theoretical point contact with the discs 138 and 142, so that a minimum of friction loss occurs between the pilot shaft actuating arm 154 and the reciprocable stem 116.

The stem 116 has a groove 160 formed in the portion thereof common to the plane of the diaphragm supporting washer 146, and an O-ring 162 is mounted in said groove to form a seal to prevent leakage along the stem 116.

Referring to FIG. 5, the pilot shaft 80 has a groove 164 formed in the portion thereof disposed in the opening 82, and a conventional O-ring 166 is mounted in said groove and provides a seal around the shaft 80 to prevent the flow of fluid along said shaft between the chambers 62 and 76.

Referring to FIG. 5, the pilot valve proper comprises a fluid distribution member 170 that forms a closure for the pressure chamber 76. The member 170 is secured to the lateral extension 74 of the housing 60 by a plurality of screws 172, a gasket 174 being disposed between the member 170 and said extension. The fluid distribution member 170 has a raised circular seat 176, FIGS. 6 and 7, that is engaged by a rotatable pilot disc 178. The disc 178 is disposed in the pressure chamber 76 and is surrounded by a skirt 180 that projects beyond one end thereof toward the wall 78. The skirt 180 is provided with a plurality of notches 182. A driver 184 is press-fitted onto a splined portion at the inner end of the shaft 80 disposed in the chamber 76. The driver 184 has lugs 185 received in the notches 182 and provides a non-rigid driving connection between the shaft 80 and the skirt 180. A compression spring 186 disposed between the pilot disc 178 and the adjacent end of the shaft 80 constantly tends to urge said disc toward the seat 176.

The fluid distribution member 170, FIG. 5, has a supply passage 183 opening into the pressure chamber 76. The passage 183 communicates with a threaded opening 187, FIG. 6, in which a conventional fitting 188 is mounted. This fitting is connected to one end of the conduit 42 extending from the inlet chamber 11 of the main valve M, whereby operating fluid under line pressure is admitted through said fitting into the pilot disc pressure chamber 76.

Referring to FIGS. 6 and 7, the fluid distribution member 170 has an axial drain port 190 extending inwardly from the seat 176. Port 190 communicates with a passage 192 that is enlarged and threaded at its outer end, as indicated at 194. A conventional fitting 196 is mounted in the opening 194 and connects the drain conduit 50 with the fluid distribution member 170. Thus, the drain port 190 of the pilot valve is connected by the conduit 50 so that spent operating fluid is returned from the pilot valve to the outlet chamber 12 of the main valve M (see FIG. 1). If desired, the connection of the conduit 50 to the main valve M may be omitted and the conduit permitted to drain to the atmosphere.

The fluid distribution member 170 also has a port 198 arranged so that one end thereof terminates in the seat 176 and its other end communicates with the inner end of a passage 200, the outer end of which is threaded at 202. A conventional fitting 204 is mounted in the passage 202 and is connected with one end of the operating fluid supply and exhaust conduit 38.

The pilot disc 178, FIGS. 6 and 7, may have any desired number of pressure and exhaust ports formed therein. However, for present purposes, only one exhaust and one pressure port are actually necessary. FIG. 6 shows the pilot disc 178 provided with one pressure port 206, which extends completely therethrough, and one U-shaped exhaust port 208. One leg of the exhaust port 208 communicates with the drain port 190 in the fluid distribution member 170; whereas, the other leg of the exhaust port 208 is adapted to register with the port 198 in said member. The pressure port 206 is disposed the same radial distance from the axis of the drain port 190, as is the outer leg of the exhaust port 208, whereby the port 206 is also adapted to register with the port 198 upon rotation of the pilot disc 178. The pilot ports 206 and 208 are disposed on radii 60° apart, as shown in FIG. 6. Hence, it will be apparent that the shaft 80 need be rotated only through an angle of 60° in order to place one or the other of the pilot ports 206 and 208 in registration with the seat port 198 to reverse the direction of flow of operating fluid through the port 198.

Referring to FIG. 4, downward movement of the stem 116 is limited by the engagement of the diaphragm supporting washer 148 with an annular shoulder 148a formed in the cover 88. On the other hand, upward movement of the stem 116 is limited by the engagement of the diaphragm supporting washer 146 with a similar shoulder 146a in the housing 60. The vertical distance between the shoulders 146a and 148a is such that the corresponding movement of the stem 116 will actuate the pilot shaft 80 through an angle of substantially 60°.

In normal use, the unit P comprising the pilot valve and control means therefor is preferably arranged so that the stem 116 is positioned vertically with the indicator assembly 124–126 at the upper end of the unit.

It will be apparent from the foregoing description that the pilot valve disc 178 will be actuated in response to the differential in pressures at the sensing points B and A, as communicated to the chambers 62 and 98 at opposite sides of the diaphragm 92 through the conduits 70 and 104, respectively. FIG. 4 illustrates the control in a position corresponding to a pressure condition wherein the pressure in the chamber 62 exceeds that in the chamber 98 sufficiently to move the stem 116 downwardly to engage the diaphragm supporting washer 148 with the shoulder 148a and actuate the pilot disc 178 to a position such that the exhaust port 208 of said pilot disc registers with the port 198 in the fluid distribution member 170, to effect draining of operating fluid from the pressure chamber 34 of the main valve M through the conduit 38, permitting the main valve to open. Should the pressure conditions at the sensing points B and A change so that the pressure in the chamber 98 exceeds the pressure in the chamber 62, the diaphragm supporting washer 146 will be moved into engagement with the shoulder 146a to move the pilot disc 178 through an angle of 60° in a clockwise direction as viewed in FIG. 4. This will result in the pressure port 206 of the pilot disc being placed in registration with the seat port 198 so that operating fluid under pressure will now pass from the pilot pressure chamber 76 through the conduit 38 to the pressure chamber 34 of the main valve M to admit operating fluid into said chamber to move the main valve toward closed position. The rate of opening and closing of the main valve M can be obviously controlled by adjusting the needle valve N.

The pressure at the sensing points A and B will vary in accordance with the change in demand of effluent flow through the pipe 8 and will effect operation of the pilot control unit P with subsequent control of the main valve M to maintain a constant condition in the liquids being blended. The main valve M is quite sensitive and will respond to slight variations in hydraulic pressure transmitted through the porting of the pilot valve under control of the differential pressure operated actuator. In this manner, the main valve M responds to slight variations in pressure to open farther or to move toward closed position to compensate for changes in effluent flow.

In the system described above, the orifice at R–1 is the primary orifice and is of fixed size, although it may be of an adjustable type, if desired. The valve R–2 functions as an adjustable restriction that will vary the pressure drop across the orifice at R–1, and thus control the percentage of the raw water that is blended with the softened water. Normally, the pressure at B is maintained equal to the pressure at A within plus or minus 6 inches water pressure. With pressure at A and B equal, the differential pressure between points B and C will be equal to the differential pressure between points A and C. At operating flow rates, the pressure loss between D and A must never be less than that between D and B with the main valve M wide open. With this arrangement of flow restricting orifices, for sensing control, the blend at C remains constant within close tolerances, regardless of fluctuation in the demand. For example, excellent control will result within approximately plus or minus 5% accuracy when a 60-inch water pressure differential is created across the fixed restriction R–1 at the lowest flow rate.

The valve R–3 functions as an adjustable orifice and may be omitted if conditions permit. However, this valve has been included in the system of FIG. 1 since its presence would be necessary should the following conditions prevail in the system:

(1) The main valve M assumes a fully opened position instead of modulating to effect correct blending; or (2) The pressure loss through the softener S between the point D and the pressure sensing point A is less than the pressure loss through the main valve M between the point D and the pressure sensing point B.

Thus, it will be apparent that the restrictor valve R–3 can be adjusted to increase the pressure loss between the point D and the pressure sensing point A, to thereby restore the loss of blending control through the main valve M.

It is equally apparent that a greater pressure at the sensing point B, due to condition 2 above, would cause the pressure differential control to hold the main valve M open. Loss through the water softener S and associated piping can be calculated in advance to determine whether or not the system will require the valve R–3 to prevent loss of control of the blending system through the main valve M.

Should the pressures at the sensing points B and A become equal, the pressure in the chambers 62 and 98 will correspondingly be equal so that a state of equilibrium will exist. The diaphragm 92 will assume a central position, and the pilot disc 178 will assume an intermediate position blocking seat port 198, so that no change in pressure in operating fluid will occur in the pressure chamber 34 of the valve M, whereby said valve will remain static.

Should an unbalanced condition develop in the sensing lines, that is, at the sensing points A and B, caused by a change in flow rate, the reaction of the pilot control is immediate and the main valve M will be caused either to open or close, depending upon the differential of the pressures at the sensing points. If it is assumed that the demand for blended water increases, resulting in a decrease in pressure at the sensing point A, or that there is an increase in the differential pressure between the sensing points A and B (with a corresponding drop in pressure in chamber 98 and increase in pressure in chamber 62), the increase in flow at the pressure sensing point A will create a demand for more flow of raw water through the by-pass pipe 9 at the pressure sensing point B to maintain the desired blend ratio. The increased flow through the main valve M is effected by rotation of the pilot disc 178, through downward movement of the stem 116, to connect the chamber 34 of the main valve with the drain conduit 50, through partial interconnection of said diaphragm chamber with said drain conduit. At such time, the pilot exhaust port 208 partially overlaps the seat port 198 to drain operating fluid from the chamber 34. This results in reducing the pressure in the chamber 34 so that line pressure in the pipe 9 causes the valve M to move to a more open position, consequently permitting a greater volume of flow of raw water through the valve M to blend with the effluent from the pipe 8. In this manner, the control system compensates for increased demand of raw water to meet the increased demand on the effluent pipe 8 to provide the correct ratio or blend desired. If there is a reduced demand of effluent from the pipe 8, the reverse action takes place, with the pilot disc port 206 being moved into at least partial registry with seat port 198 to permit flow of operating fluid to the chamber 34 to effect partial closing of the main valve M and reduce the flow of raw water through the by-pass pipe 9 to automatically maintain the desired ratio of raw water to softened water.

To obtain a blend ratio of 1 to 1, the differential pressure created by the restrictor valve R–2, when adjusted to "full open" position, must not be greater than the differential pressure created by the fixed restrictor R–1 when passing fluid at an equal flow rate.

Where the blend ratio requires less flow at the restrictor valve R–2 than at the fixed orifice R–1, the differential pressure created by the valve R–2 at "full open" position can be proportionally greater than the pressure differential created by the fixed restrictor R–1 at an equal flow rate.

Where the blend ratio requires greater flow at the restrictor valve R–2 than at the fixed restrictor R–1, the differential pressure created by the restrictor valve R–2 at "full open" position must be proportionally less than the differential pressure created by the fixed restrictor R–1 at an equal flow rate.

FIG. 8 illustrates a system for blending two different fluids under pressure, irrespective of the source of origin of the fluids, and disclosure thereof has been includes to make it clear that the principles of the present blending system are not limited to use with a water softener or other fluid treating apparatus. In FIG. 8, the parts corresponding to those of FIG. 1 have been identified by the same reference numerals, with the exception of the pipes 8 and 9, which have been identified as 8a and 9a, respectively. Pipe 8a is connected with a source of one fluid under pressure; whereas, pipe 9a is connected with a source of a different fluid under pressure and which is to be blended in predetermined proportion with said one fluid. The pressure of the fluids in the pipes 8a and 9a can be controlled by conventional pressure regulating means, if necessary, to assure proper functioning of the blending system.

Since the components of the blending system shown in FIG. 8 are identical to those shown in FIG. 1, they will function in the same manner to blend the two fluids, either liquid or gas, in the desired proportion determined by the fixed orifice R–1 and the adjustable restrictor valve R–2. The restrictor valve R–3 may be omitted in installations where not required.

It will be understood that various changes may be made in the details of construction and arrangement of the components of the systems described hereinabove,

I claim:

1. A system for blending two different fluids in predetermined proportion, comprising: a first pipe for conducting a first fluid, and having a pressure sensing point therein; a second pipe for conducting a second fluid different from said first fluid, said second pipe being connected to said first pipe downstream of said sensing point in said first pipe for blending said second fluid with said first fluid; a main valve connected in said second pipe upstream of the point of connection of said second pipe with said first pipe, and including fluid pressure actuated means for controlling the rate of flow of said second fluid through said second pipe in predetermined proportion to the rate of flow of said first fluid in said first pipe, said second pipe having a pressure sensing point therein between said main valve and the point of connection of said second pipe with said first pipe; and pilot valve means separate from said main valve for controlling said main valve, said pilot valve means having a pressure chamber and having means to connect said pressure chamber with the inlet side of said main valve to derive operating fluid therefrom for said main valve, and including: conduit means connecting said pilot valve means with said fluid pressure actuated means for supplying operating fluid to and exhausting operating fluid from said fluid pressure actuated means; a differential pressure responsive device, including means in said pressure chamber operable to selectively either establish communication between said pressure chamber and said conduit means to exclusively supply said operating fluid to said fluid pressure actuated means, or to cooperate with said conduit means to exclusively exhaust operating fluid from said fluid pressure actuated means through said conduit means; and means connected to said sensing points and to said differential pressure responsive device, and arranged to operate said device in accordance with the differential of pressure between said sensing points, whereby to control said main valve to vary the amount of said second fluid flowing through said second pipe in accordance with changes in the rate of flow of said first fluid through said first pipe and consequent changes in said differential pressure.

2. A system as defined in claim 1, in which the first pipe has means connected therein providing a flow restricting orifice located between the point of connection of said second pipe with said first pipe, and the pressure sensing point in said first pipe.

3. A system as defined in claim 2, wherein the sensing point in said first pipe is located in said first pipe adjacent to and on the upstream side of the flow restricting orifice, and wherein flow restricting means is connected in said second pipe between the sensing point therein and the point of connection of said second pipe with said first pipe.

4. A system as defined in claim 2, in which the sensing point in said first pipe is located in said first pipe adjacent the flow restricting orifice.

5. A system as defined in claim 4, in which flow restricting means is connected in said second pipe between the pressure sensing point therein and the point of connection of said second pipe with said first pipe.

6. A system as defined in claim 5, wherein additional flow restricting means is connected in said first pipe on the upstream side of said sensing point therein.

7. A system for blending two different fluids as recited in claim 1, including additionally a fluid treatment tank having an inlet and an outlet, the inlet of said tank being connected to said second pipe upstream of said main valve, and the outlet of said tank being connected to said first pipe upstream of said sensing point therein.

8. A system for blending two different fluids as recited in claim 7, wherein said fluid treatment tank is a water softener tank.

References Cited by the Examiner

UNITED STATES PATENTS

| 1,290,513 | 1/1919 | Collins | 137—100 X |
| 1,910,004 | 5/1933 | DeVille | 137—625.28 X |
| 2,006,287 | 6/1935 | Wilbanks | 210—190 |
| 2,112,476 | 3/1938 | Bowers et al. | 210—191 X |
| 2,195,005 | 3/1940 | Grosvener | 137—100 |
| 2,323,876 | 7/1943 | Rickett | 210—96 |
| 2,888,032 | 5/1959 | Griswold | 137—486 |
| 2,919,590 | 1/1960 | Griswold | 251—61 X |
| 3,047,003 | 7/1962 | Gurney | 137—100 |

OTHER REFERENCES

Perry, J. H., Chemical Engineers' Handbook. McGraw-Hill Book Co., 1950, (p. 1283 relied on).

REUBEN FRIEDMAN, *Primary Examiner.*

HENRY B. THORNTON, HERBERT L. MARTIN, M. CARY NELSON, *Examiners.*